United States Patent
Ono et al.

(10) Patent No.: US 9,122,084 B2
(45) Date of Patent: Sep. 1, 2015

(54) PHASE MODULATION APPARATUS

(71) Applicants: NTT ELECTRONICS CORPORATION, Yokohama-shi, Kanagawa (JP); NIPPON TELEGRAPH AND TELEPHONE CORPORATION, Chiyoda-ku, Tokyo (JP)

(72) Inventors: Shigeru Ono, Yokohama (JP); Kouichi Ogihara, Yokohama (JP); Jun Endo, Musashino (JP); Mikio Yoneyama, Musashino (JP)

(73) Assignees: NTT ELECTRONICS CORPORATION, Kanagawa (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 86 days.

(21) Appl. No.: 13/871,714

(22) Filed: Apr. 26, 2013

(65) Prior Publication Data

US 2014/0233084 A1    Aug. 21, 2014

Related U.S. Application Data

(60) Provisional application No. 61/766,964, filed on Feb. 20, 2013.

(51) Int. Cl.
*G02F 1/01* (2006.01)
*G02F 1/225* (2006.01)
(Continued)

(52) U.S. Cl.
CPC .............. *G02F 1/01* (2013.01); *G02F 1/0123* (2013.01); *G02F 1/225* (2013.01);
(Continued)

(58) Field of Classification Search
CPC ............ G02F 1/0121; G02F 2001/212; G02F 2203/12; G02F 2203/50; G02F 1/025; G02F 2203/18; G02F 2/00; G02F 1/0126; G02F 1/353; G02F 2203/58; G03H 2001/0224; G03H 2225/25; G03H 2001/2655
USPC ................ 385/3; 359/237, 238, 308; 398/188
See application file for complete search history.

(56) References Cited

FOREIGN PATENT DOCUMENTS

| JP | 2007208472 A | * | 8/2007 |
| JP | 2007-329886 | | 12/2007 |
| JP | 2008-172714 | | 7/2008 |

OTHER PUBLICATIONS

Japanese Patent Office Action dated Apr. 10, 2012 corresponding to Japanese Patent Application No. 2011-020104; 8 pages.
(Continued)

*Primary Examiner* — Thomas K Pham
*Assistant Examiner* — Sharrief Broome
(74) *Attorney, Agent, or Firm* — Ohlandt Greeley Ruggiero & Perle L.L.P.

(57) ABSTRACT

A phase modulation apparatus has a light source outputting continuous light, two phase modulators, and an intensity modulator. The phase modulation apparatus is provided with an RZ phase modulation circuit, in which the phase modulators phase-modulate the continuous light from the light source with data signals input to the phase modulators and generate two phase modulation optical signals, a phase shifter shifts the phase of one phase modulation optical signal by $\pi/2$, and an intensity modulator intensity-modulates a multiplexed signal, combined with the other phase modulation optical signal, with an input clock signal CLK to convert the signal into an RZ signal, and, thus, to output the RZ signal, and a phase control circuit which adjusts the phases of the phase modulation optical signals generated by the phase modulator of the RZ phase modulation circuit so that the output of the RZ phase modulation circuit is maximum.

4 Claims, 24 Drawing Sheets

(51) Int. Cl.
*H04B 10/50* (2013.01)
*H04B 10/556* (2013.01)
*G02F 1/21* (2006.01)

(52) U.S. Cl.
CPC ..... *H04B 10/5053* (2013.01); *H04B 10/50577* (2013.01); *H04B 10/5561* (2013.01); *G02F 2001/212* (2013.01); *G02F 2203/21* (2013.01); *H04B 2210/517* (2013.01)

(56) References Cited

OTHER PUBLICATIONS

Japanese Patent Office Action dated Aug. 14, 2012 corresponding to Japanese Patent Application No. 2011-20104; 7 pages.
Japanese Patent Office Action dated Oct. 1, 2013 corresponding to Japanese Patent Application No. 2012-226287; 5 pages.

* cited by examiner

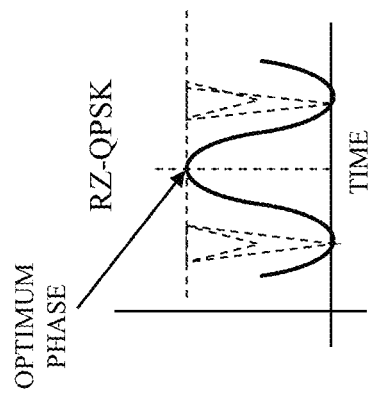

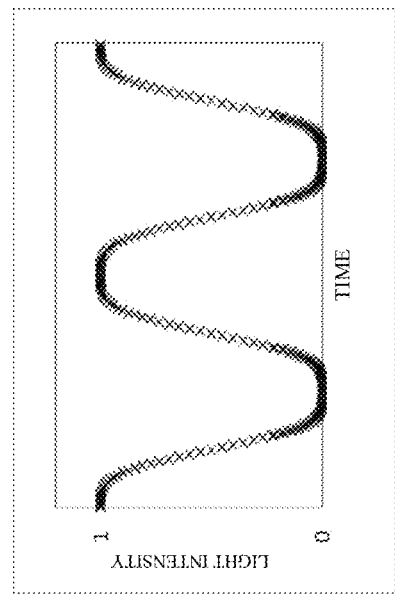
FIG. 4A IN ABSENCE OF SKEW

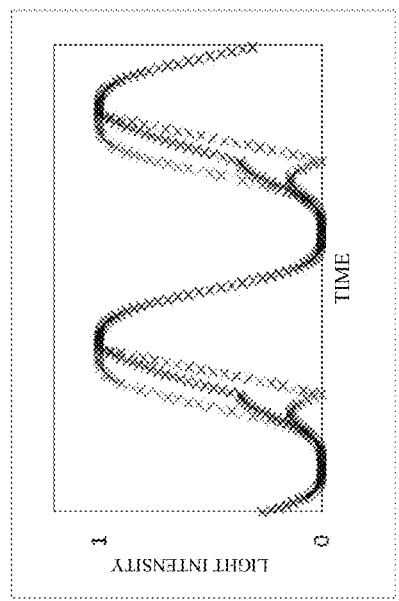

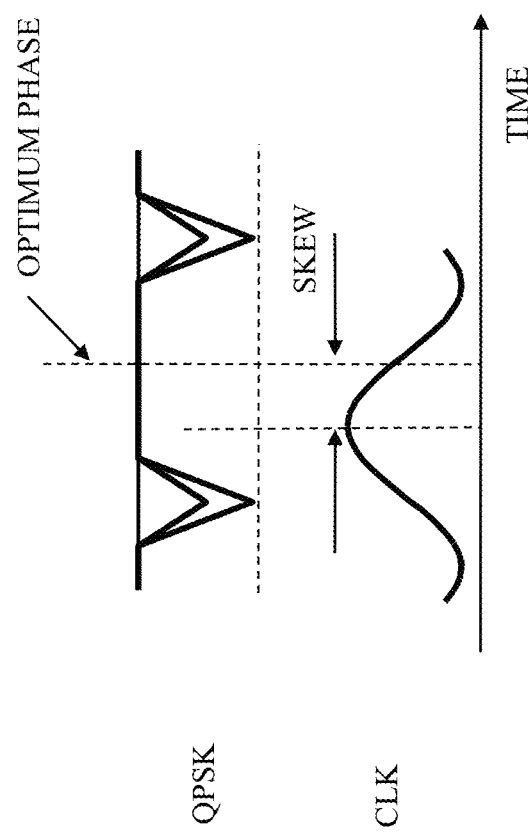
FIG. 4C SKEW BETWEEN DATA AND CLOCK

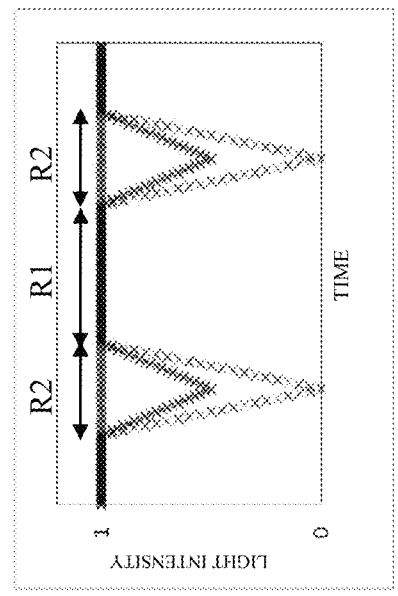
FIG. 5A IN ABSENCE OF SKEW
R1 PHASE CONFIRMATION REGION
R2 PHASE TRANSITION REGION

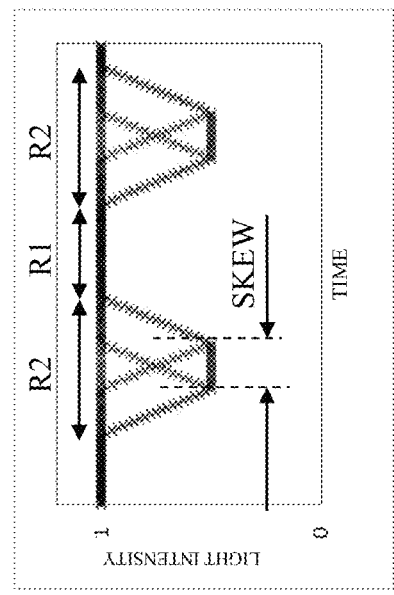
FIG. 5B IN PRESENCE OF SKEW
R1 PHASE CONFIRMATION REGION
R2 PHASE TRANSITION REGION

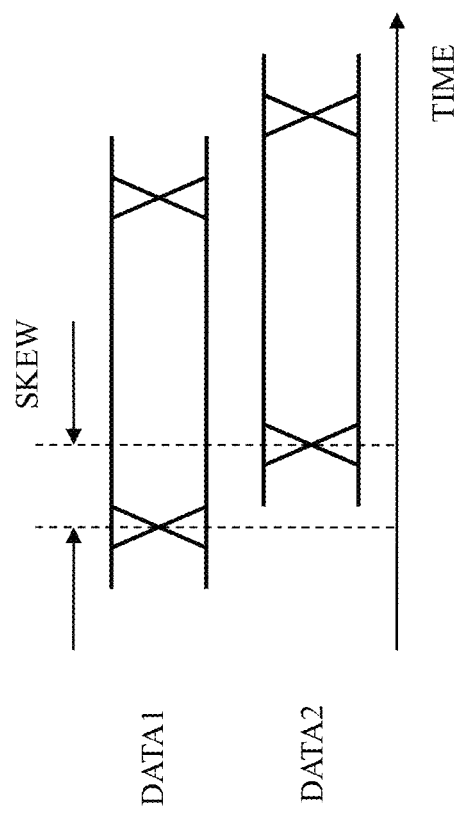
FIG. 5C SKEW BETWEEN DATA

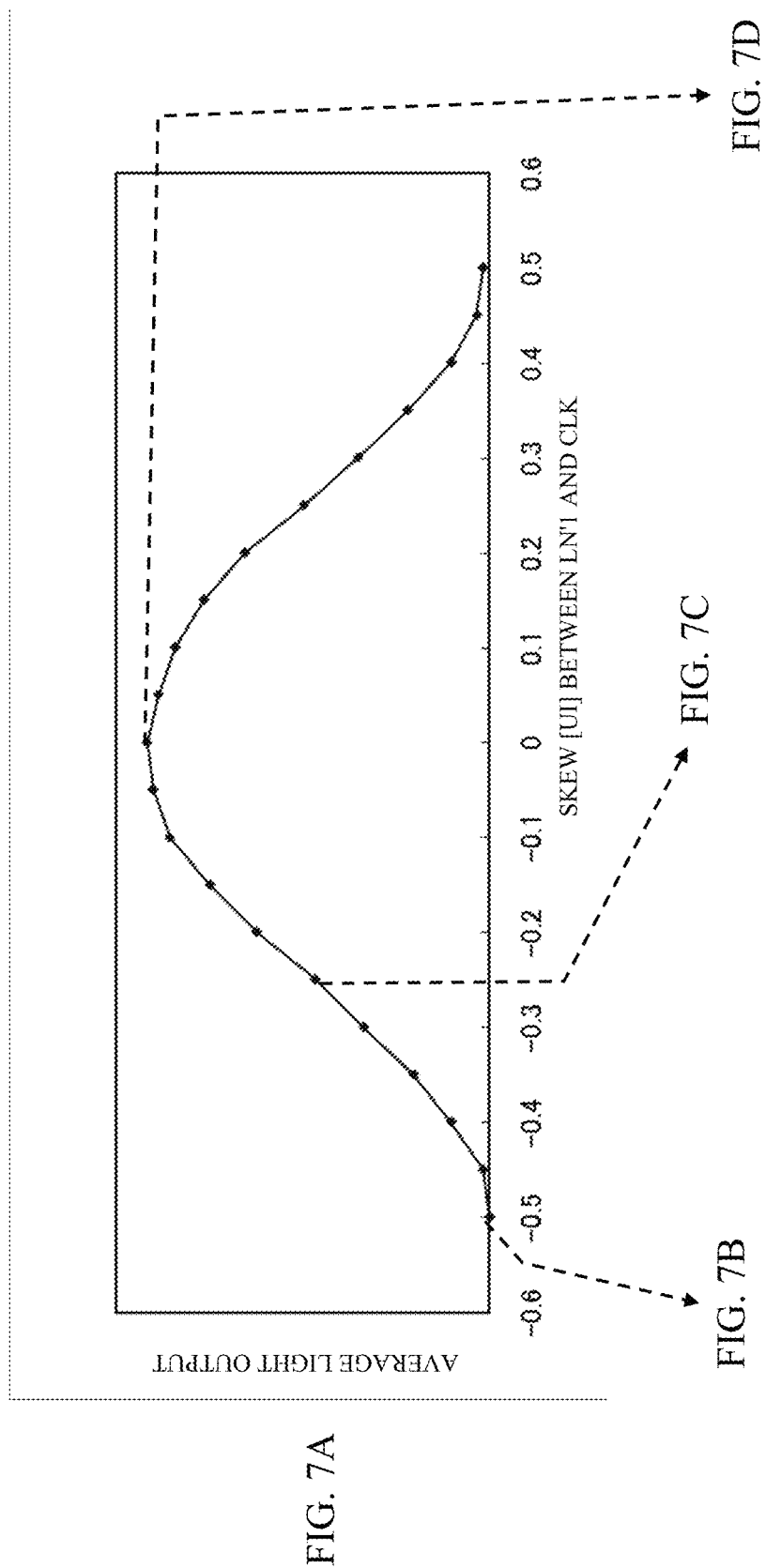

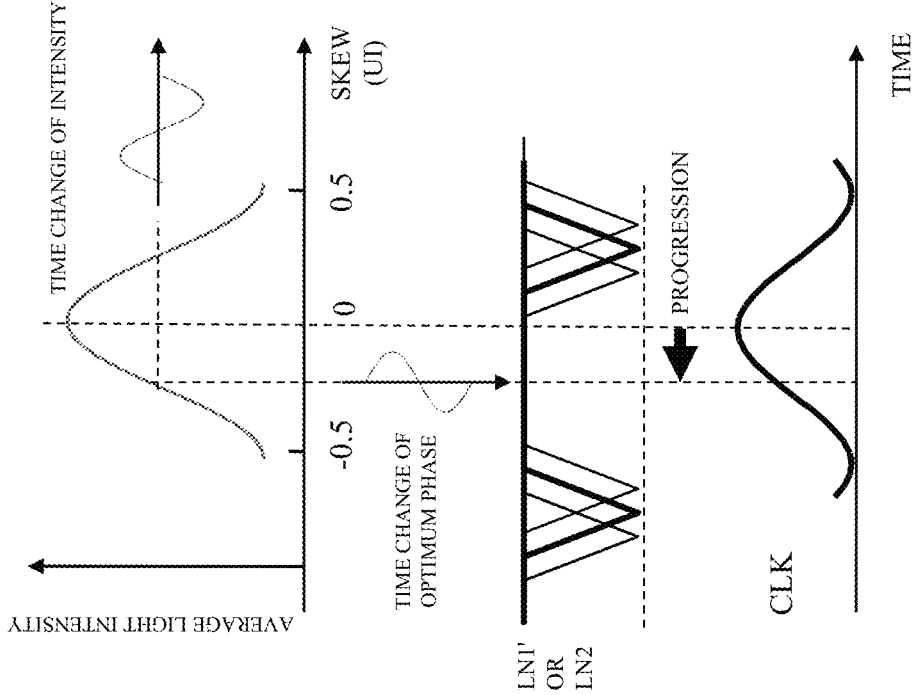
FIG. 11A DATA PROGRESSION STATE

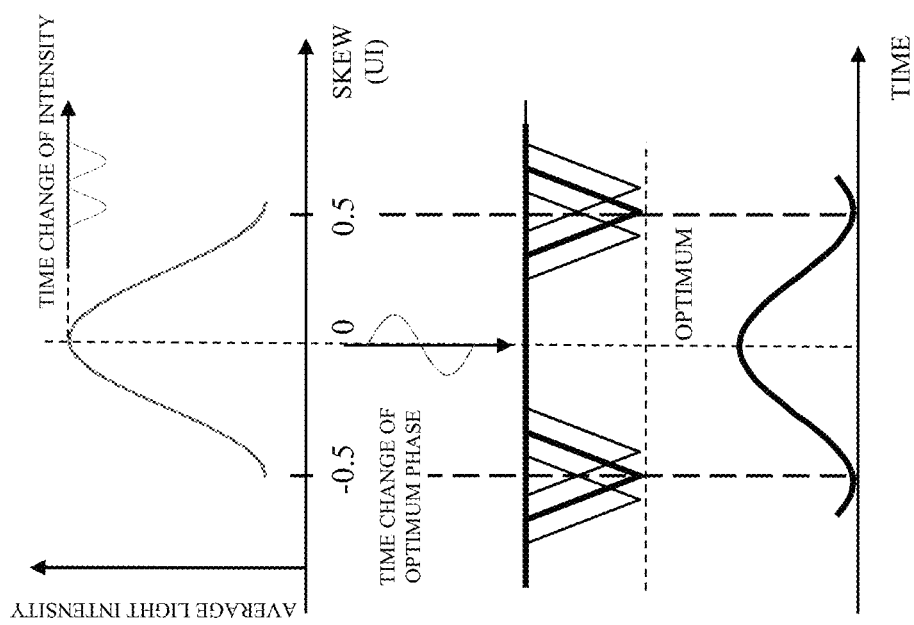
FIG. 11B OPTIMUM STATE

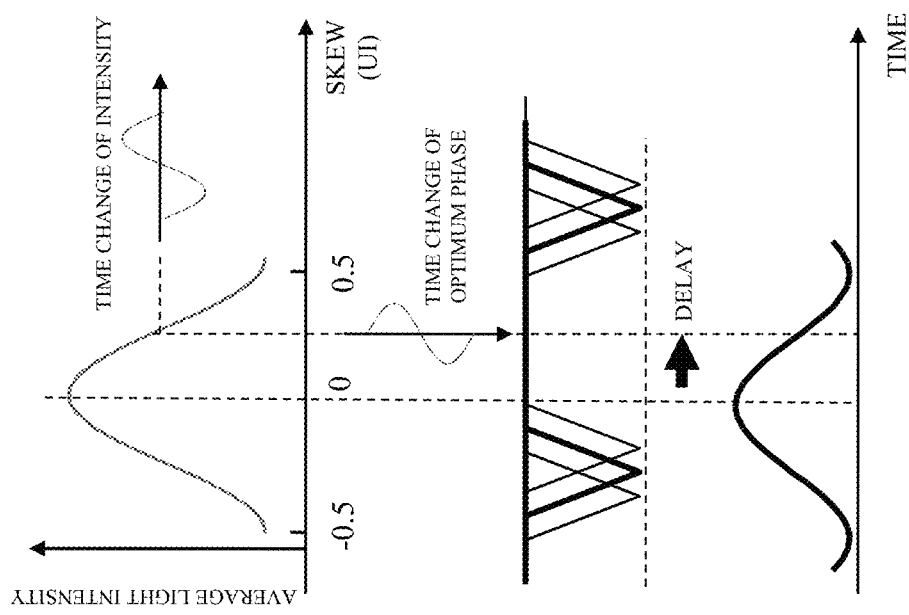
FIG. 11C DATA DELAY STATE

PHASE MODULATION APPARATUS

BACKGROUND

1. Field of the Disclosure

The present disclosure relates to a phase modulation apparatus which modulates a phase of light in a digital signal sequence.

2. Discussion of the Background Art

As a method of modulating light with a digital signal, Quadrature Phase Shift Keying (QPSK) and Differential Quadrature Phase Shift Keying (DQPSK) have been known (for example, see Patent Document 1).

In a long-haul transmission system, in order to suppress interference between codes and to realize the high sensitivity, a QPSK modulated or DQPSK modulated optical signal is sometimes further subjected to RZ (Return to Zero) intensity modulation. FIG. 1 is a view for explaining a phase modulation apparatus 300 employing an RZ-QPSK modulation method. The RZ-QPSK modulation is performed by the following procedure.

(1) Continuous light LD of a light source 10 is branched by a 1:2 coupler 11.
(2) Phase modulators (12-1, 12-2), based on the digital input signal (DATA1, DATA2) convert the continuous light (LD1, LD2) into binary phase modulation optical signals (LN1, LN2), the phase of which is 0 or $\pi$.
(3) A 2:1 coupler 14 combines two phase modulation optical signals (LN1', LN2) in a state that the phase of LN1' is shifted from the phase of LN1 by $\pi/2$ phase by a phase shifter 13 and outputs a quadrature phase modulation signal QPSK.
(4) An intensity modulator 15 intensity-modulates the phase modulation signal QPSK with a clock signal CLK synchronized with the digital input signal and outputs an optical signal RZ-QPSK converted into an RZ signal.

The above procedure will be further described in detail in FIGS. 2 and 3. FIG. 2 is a view for explaining a process for generating the quadrature phase modulation optical signal from the binary phase modulation signal generated by phase modulators 1 and 2. In this example, an intensity modulator is used as a phase modulator. Namely, the amplitude of the digital input signal is set to twice a half-wave voltage of the intensity modulator, and, at the same time, a '0'/'1' level of the signal is set to a maximum transmission point of the intensity modulator, whereby digital '0'/'1' bits are converted into optical bits having a relative optical phase $0/\pi$. Thus, the binary phase modulation optical signals LN1 and LN2 are generated. In this constitution, optical output is temporarily 0 at a phase transition point at which the optical phase is changed from 0 to $\pi$, or contrary to this. LN1 further becomes LN1' in which the optical phase is shifted by $\pi/2$ by a $\pi/2$ phase shifter. LN1' and LN2 are combined at a timing where the respective bits are overlapped, whereby QPSK phase modulation light in which the optical phase has four values of $\pi/4$, $\pi/4$, $5\pi/4$, and $7\pi/4$ is generated.

FIG. 3 shows eye diagrams of signals in a phase modulation apparatus 300. FIG. 3A shows the continuous light LD emitted from the light source 10. The light intensity of the continuous light LD does not change. FIG. 3B shows the binary phase modulation optical signal LN1 (LN2) output by the phase modulator 12-1 (12-2). Although the phase modulation optical signal LN1 maintains a constant light intensity in such a state that the optical phase is confirmed, the light is temporarily extinguished at the phase transition point as described above, and therefore, a notch N is generated in the eye diagram. FIG. 3C shows the quadrature phase modulation optical signal, QPSK, output from the 2:1 coupler 14. As described above, the two phase modulation optical signals (LN1', LN2) are combined at a timing in which the respective bits are overlapped, whereby QPSK involves four phase states. Since the timing in which phase transition occurs is overlapped, the depth of the notch N is determined by two patterns depending on whether the phase transition occurs simultaneously in LN1' and LN2 or whether the phase transition occurs in either one of LN1' and LN2. FIG. 3D shows the RZ optical signal RZ-QPSK output from the intensity modulator 15. The RZ optical signal RZ-QPSK is obtained by applying RZ pulse modulation to a region where the optical phase is confirmed by a clock signal CLK synchronized with the digital input signal. As shown in the same drawing, this state is optimum when modulation is applied at a timing in which the peak of CLK overlaps an optimum phase (in between the notches). By virtue of conversion into the RZ signal, intersymbol interference between close signals is suppressed, and a high pulse peak value is obtained with respect to an average light intensity; therefore, a long-haul transmission system having high sensitivity and excellent nonlinear tolerance can be realized.

Patent Document 1: Japanese Patent Laid-Open Publication No. 2007-208472

An RZ-QPSK generating method will be described by such a procedure that two binary phase modulation lights are synthesized at a timing in which the respective bits of the binary phase modulation lights overlap to thereby generate quadrature phase modulation light, and RZ modulation is applied with a clock signal, using the center between the notches as an optimum phase. As seen from above, it is obvious in the RZ-QPSK generation, there is a problem that the timings of three kinds of signals including two data sequences (LN1', LN2) and the clock CLK are aligned in parallel. The effect of a case where the timings between those signals are not aligned in parallel will be hereinafter described.

FIG. 4 shows the influence of deviation (skew between data and clocks) of the timing between the quadrature QPSK phase modulation light and CLK. When there is no skew, an output waveform is a repetitive pulse having constant time width as shown in FIG. 4A. However, when skew occurs, a notch and an RZ modulation clock interfere to remove a pulse, so that the output waveform becomes a distorted pulse as shown in FIG. 4B. Such distortion becomes lack of information to lead to significant deterioration of transmission characteristics.

FIG. 5 is a view for explaining the influence of the skew between data of the binary phase modulation light LN1' and LN2 input to the 2:1 coupler 14. As described above, the quadrature QPSK phase modulation light includes a phase confirmation region R1 where four phase states are confirmed and a phase transition region R2 where the phase transition occurs and a notch is generated. When there is no skew, since the timings of phase transition between two signals are aligned in parallel equal, notches having different depths and the same width as shown in FIG. 5A are generated in the eye diagram. However, when the skew occurs, since multiplexing is performed while the timings of phase transition between two signals are deviated, the notch seen in the eye diagram is separated. Thus, as shown in FIG. 5B, the phase confirmation region is narrowed, and even if the clock phase is corresponded to the optimum timing, the interference with the phase transition region cannot be avoided, so that the transmission characteristics are significantly deteriorated.

Factors that the skew occurs between those three signals include variation in a delay time of individual parts (such as the modulator 12 and a driver) and wiring, delay variation depending on temperature and power supply variation, and variation in a long term. In the variation in the delay time of individual parts, the variation is individually adjusted by, for example, selection of parts having equal delay or adjusting by a phase shifter upon manufacturing, whereby it is possible to tentatively correspond to the variation in the delay time of individual parts. However, it is impossible to correspond to the delay variation due to temperature and power supply variation and variation in a long term only by initial adjustment, and such correction that operation is always performed at an optimum operating point is required.

In order to solve the above problem, this disclosure provides a phase modulation apparatus in which each component part is not required to have the same delay in the assembling and skew adjustment is easily performed even if temperature characteristics of parts and the change with time occur.

SUMMARY

In order to achieve the above object, a phase modulation apparatus according to the present disclosure is configured that an average intensity of an optical output signal is monitored, and a phase shift amount of a phase shifter provided in an electric signal path is feedback controlled so that the average intensity is maximum.

More specifically, the phase modulation apparatus according to the disclosure is provided with a light source which outputs continuous light having a constant optical phase, two phase modulators which modulate the respective optical phases of the two continuous lights, obtained by branching an output of the light source, based on two electrical data signals, a $\pi/2$ phase shifter which shifts the optical phase of an output of one of the phase modulators by $\pi/2$, a multiplexer which combines an output of the $\pi/2$ phase shifter and the output of the phase modulator, an intensity modulator which intensity-modulates an output of the multiplexer with an electrical clock signal synchronized with the electrical data signal, phase shifters which are disposed in two of electrical paths through which the electrical data signals propagate to the phase modulators and an electrical path through which the electrical clock signal propagates to the intensity modulator and shift the phase of the electrical data signals or the phase of the electrical clock signal, and a phase control circuit which controls, based on the phase of the electrical data signal or the phase of the electrical clock signal in the electrical path in which the phase shifter is not disposed, the phase of the electrical data signal or the phase of the electrical clock signal in the electrical path in which the phase shifter is disposed so that the intensity of the optical output from the intensity modulator is maximum.

The phase control circuit has a pilot signal supplying portion which performs pilot signal superimposition in which a pilot signal having a predetermined frequency is superimposed on a control signal for indicating a phase shift amount in which the phase shifter shifts the phase of the electrical data signal or the phase of the electrical clock signal and oscillates the phase shift amount with the predetermined frequency, a synchronous detecting portion which performs synchronous detection of an electrical signal, to which an output of the intensity modulator is optical-electrically converted, with the same frequency as the pilot signal, and an adjustment portion which performs adjustment operation in which the control signal of the phase shift amount adjusted so that an error signal as the output of the synchronous detecting portion is zero is output to the phase shifter.

In the phase control circuit of the phase modulation apparatus according to the disclosure, the two pilot signals provided for each of the phase shifters and having different frequencies are used, the pilot signal supplying portion performs the pilot signal superimposition so that the two pilot signals are superimposed on the control signal, the synchronous detecting portion performs synchronous detection for each of the pilot signals, and the adjustment portion may perform the adjustment operation for each of the pilot signals. In the phase modulation apparatus, the two pilot signals are assigned in the two phase shifters, and skew can be adjusted simultaneously.

Meanwhile, in the phase control circuit of a phase modulation apparatus according to the disclosure, a single pilot signal is used, and the pilot signal superimposition performed by the pilot signal supplying portion, the synchronous detection performed by the synchronous detecting portion, and the adjustment operation performed by the adjustment portion may be performed in a time-division manner. In the phase modulation apparatus, skew is alternately adjusted by the two phase shifters with a single pilot signal. Since the phase control circuit can be simplified, the phase modulation apparatus can be miniaturized.

This disclosure can provide a phase modulation apparatus in which each component part is not required to be the same length in the assembling and skew adjustment is easily performed even if temperature characteristics of parts and the change with time occur.

BRIEF DESCRIPTION OF THE DRAWINGS

FIG. 3 is a view showing an eye diagram of a signal in a phase modulation apparatus. FIG. 3D is a signal output by an intensity modulator.

FIG. 4 is a view for explaining an influence of skew between data and clocks. FIG. 4A is an output waveform when there is no skew. FIG. 4B is an output waveform when skew occurs. FIG. 4C is a view for explaining skew between data and clocks.

FIG. 5 is a view for explaining an influence of skew between data. FIG. 5A is a QPSK phase modulation light when there is no skew. FIG. 5B is a QPSK phase modulation light when skew occurs. FIG. 5C is a view for explaining skew between data.

FIG. 7 is a view for explaining an operating principle according to this disclosure. FIG. 7A is a view for explaining a state in which an average light intensity of an RZ optical signal is changed by skew between LN1' and CLK.

FIG. 11 is a view for explaining a method of determining a control direction of a phase shifter. FIG. 11A is a view for explaining a state in which the phase of data progresses relative to the phase of a clock. FIG. 11B is a view for explaining a state in which the phase of data and the phase of the clock coincide with each other. FIG. 11C is a view for explaining a state in which the phase of data delays relative to the phase of the clock.

DETAILED DESCRIPTION OF THE PREFERRED EMBODIMENT

Figure 1:
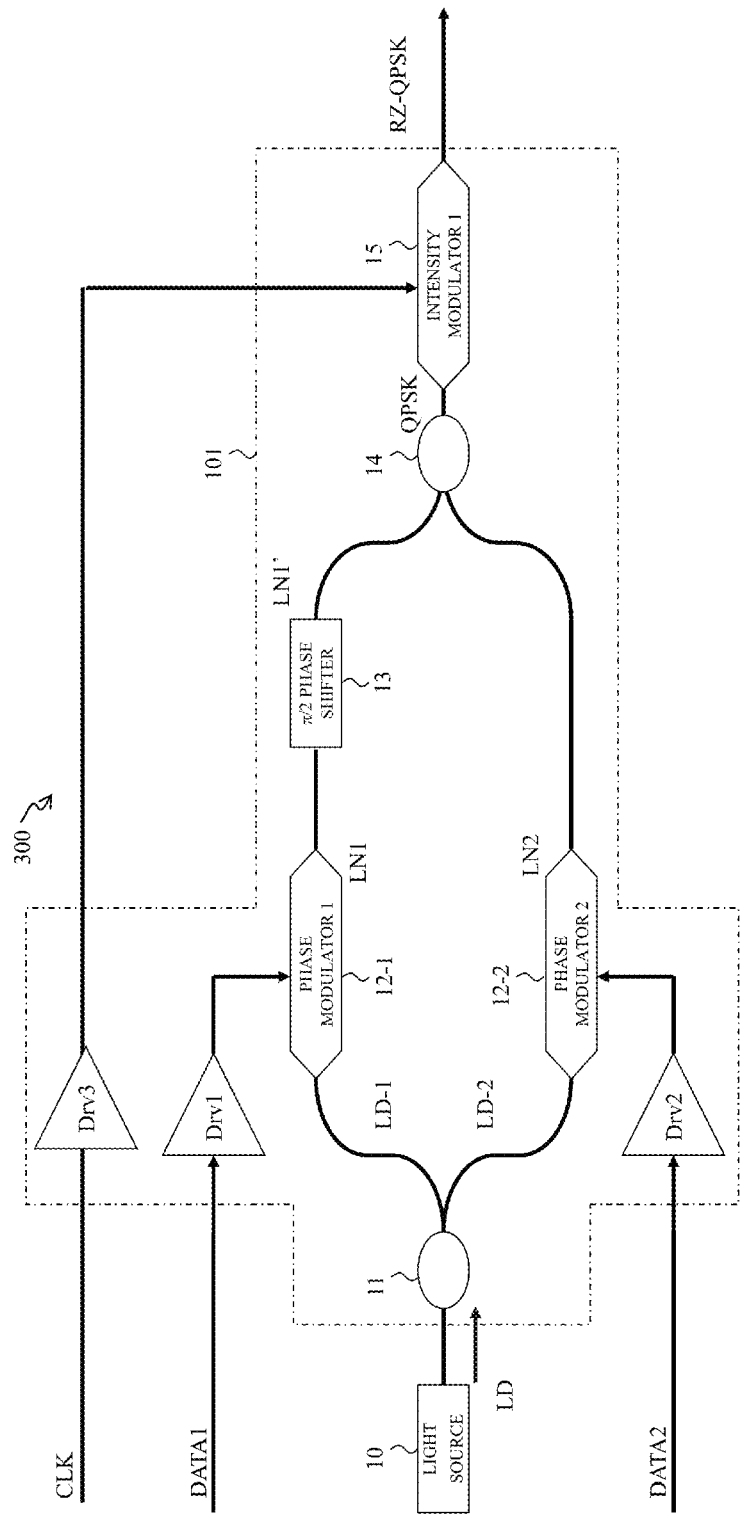
FIG. 1 is a view for explaining a phase modulation apparatus employing an RZ-QPSK modulation method.
Figure 2:
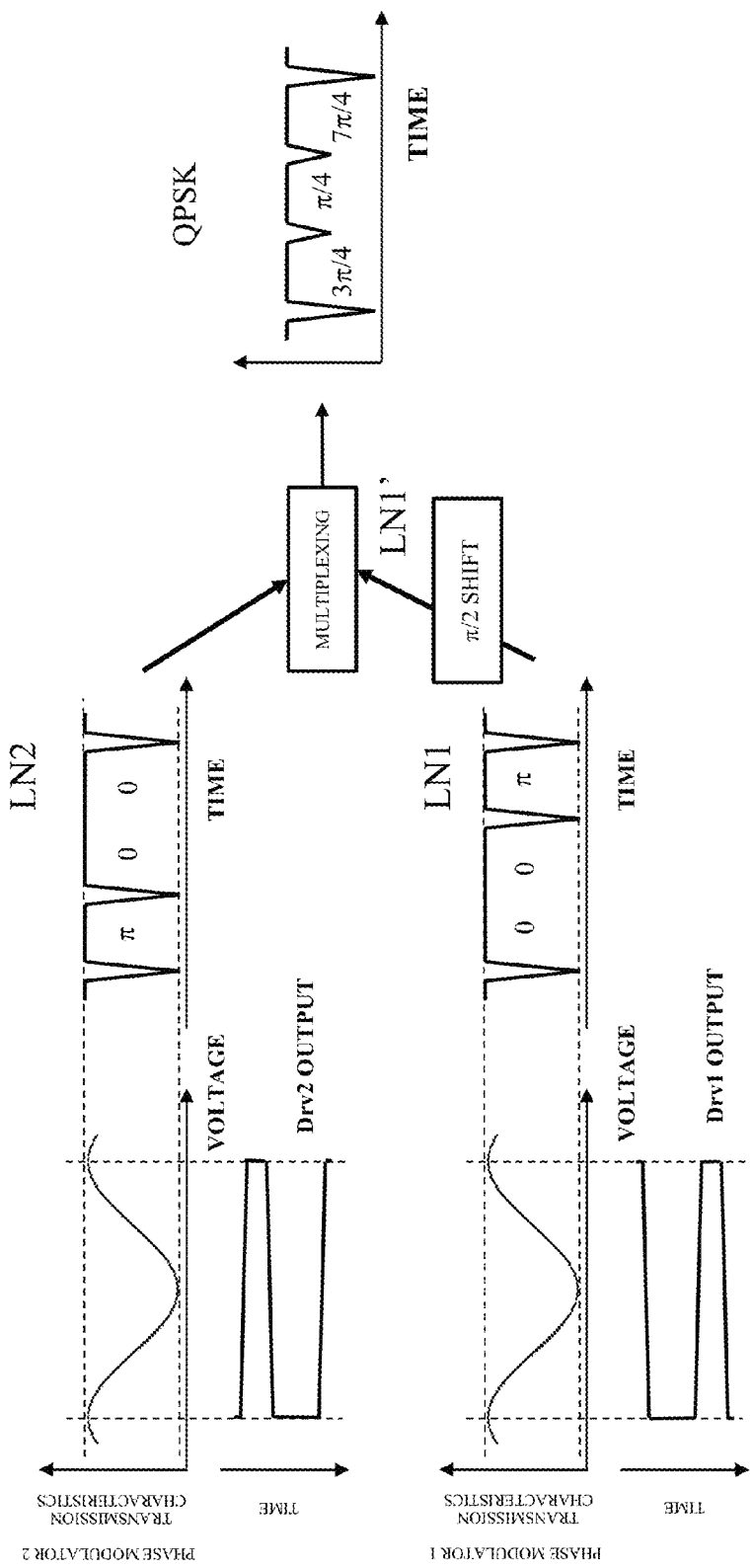
FIG. 2 is a view for explaining generation of a QPSK signal.
Figure 3A:
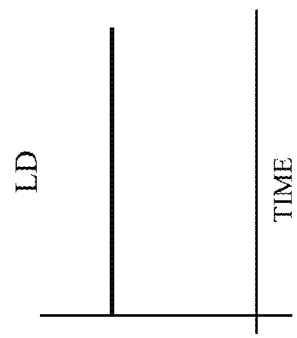
FIG. 3A is a signal output from a light source.
Figure 3B:
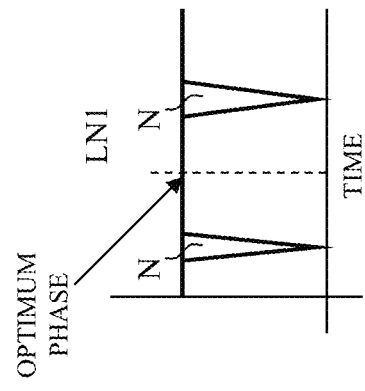
FIG. 3B is a signal output by a phase modulator.
Figure 3C:
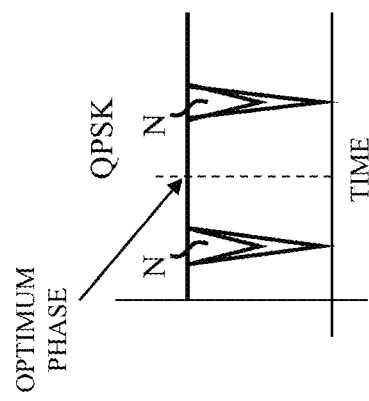
FIG. 3C is a signal output by a 2:1 coupler.

Embodiments of the present disclosure will be described with reference to the accompanying drawings. The embodiments to be described below are examples of the disclosure, and the disclosure is not limited to the following embodiments. Component elements denoted by the same reference numerals in the present specification and the drawings mutually denote the same components.

First Embodiment

Figure 6:
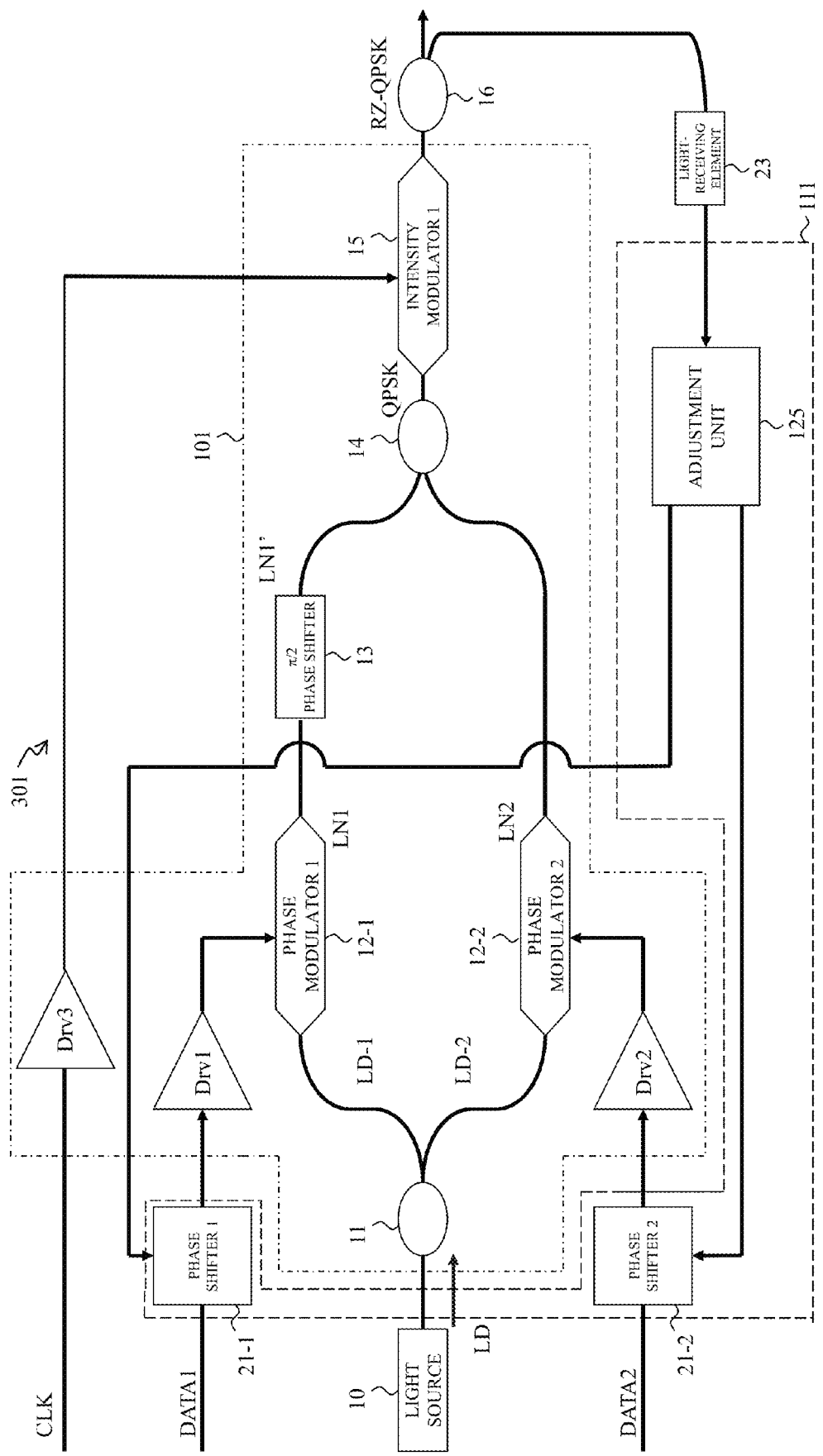
FIG. 6 is a view for explaining the phase modulation apparatus according to this disclosure.

FIG. 6 is a view for explaining a phase modulation apparatus 301 as an example of the present embodiment. The phase modulation apparatus 301 is provided with an RZ phase modulation circuit 101 and a phase control circuit 111. The RZ phase modulation circuit 101 has a light source 10 outputting continuous light and two phase modulators (12-1, 12-2) and an intensity modulator 15. The phase modulators (12-1, 12-2) phase-modulates the continuous light from the light source 10 based on data signals (DATA1, DATA2) input to each phase modulators and generate two phase modulation optical signals. A phase shifter 13 shifts one phase of the phase modulation optical signal by π/2 and generates a quadrature phase modulation signal combined with the other phase modulation optical signal. An intensity modulator 15 intensity-modulates the quadrature phase modulation signal with a clock signal CLK synchronized with the data signal to convert the signal into an RZ signal, and, thus, to output the RZ signal. The phase control circuit 111 has phase shifters (21-1, 21-1) arranged in each electrical path of data signals (DATA1, DATA2) and an adjustment unit 125 which determines a phase shift amount of the data signals (DATA1, DATA2) so that the light intensity of an RZ optical signal RZ-QPSK output by the intensity modulator 15 based on the phase of the clock signal (CLK) is maximum and outputs a control signal to the phase shifters (21-1, 21-2).

Figure 7B:
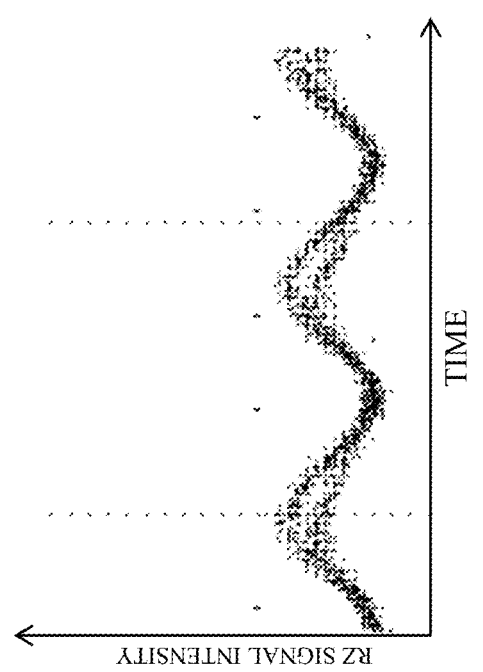
FIG. 7B shows a result obtained when the RZ optical signal is observed with an oscilloscope when skew is 0.5 UI.
Figure 7C:
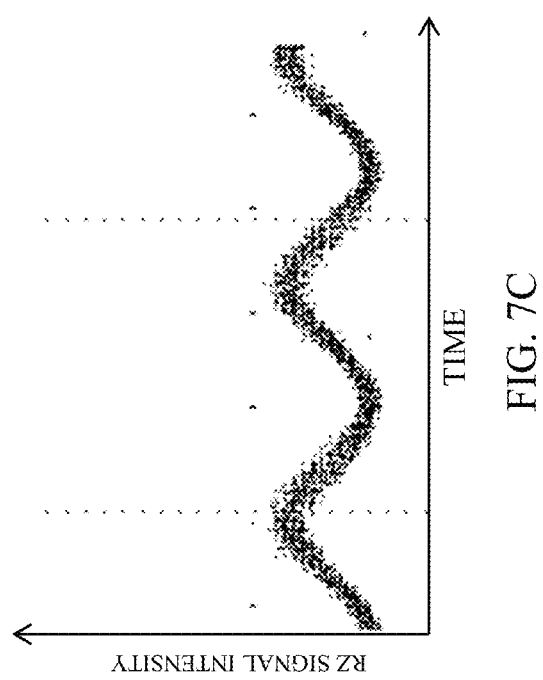
FIG. 7C shows a result obtained when the RZ optical signal is observed with the oscilloscope when the skew is 0.25 UI.
Figure 7D:
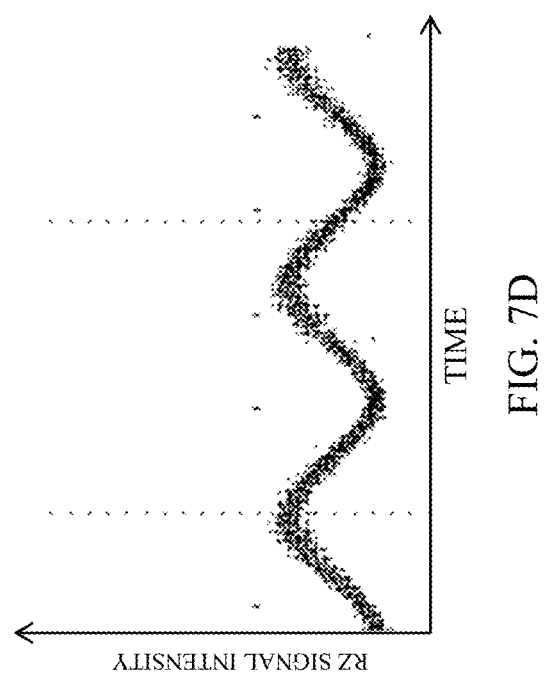
FIG. 7D shows a result obtained when the RZ optical signal is observed with the oscilloscope where there is no skew.

The operating principle of this embodiment will be described using FIGS. 7 and 8. FIG. 7A is a view for explaining a state in which an average light intensity of the RZ optical signal RZ-QPSK changes when skew between LN1' and CLK is changed from −0.5 UI (Unit Interval) to +0.5 UI with the use of the phase shifter 21-1 from a state in which a phase relationship between the phase modulation optical signals LN1' and LN2 output by the phase modulator 12 and CLK is optimum. FIGS. 7B to 7D show results obtained when the RZ optical signal in each phase is observed with an oscilloscope. When skew is large as shown in FIGS. 7D to 7B, an interference between the notch N and CLK occurs as shown in FIGS. 7D to 7B, and therefore, the average light intensity of the RZ optical signal RZ-QPSK is reduced as shown in FIG. 7A. This fact shows that when the average light intensity of the RZ optical signal RZ-QPSK is maximum, skew adjustment can be performed.

Figure 8:
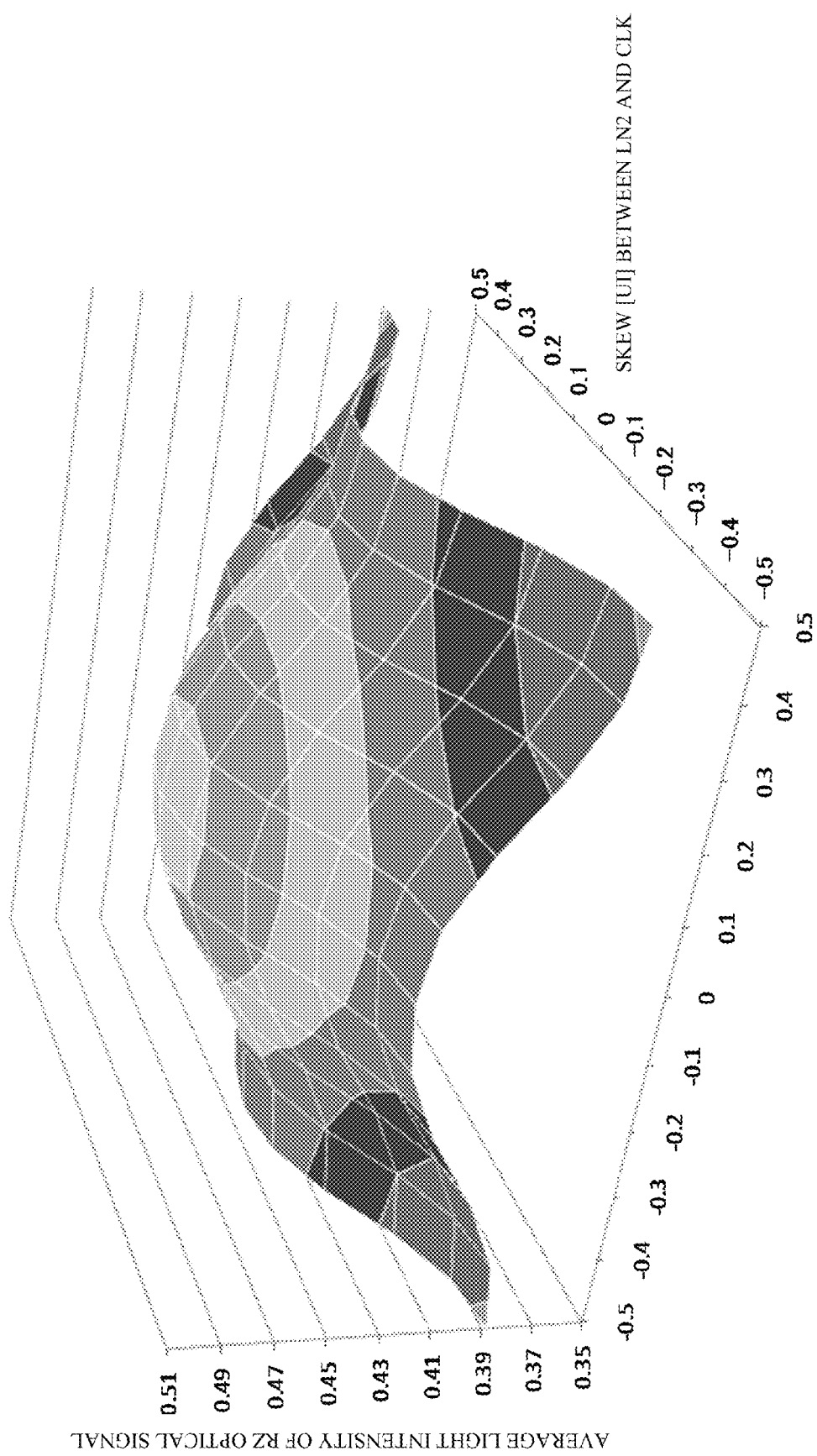
FIG. 8 is a view for explaining an operating principle according to this disclosure.

FIG. 8 is a view for explaining a state in which the average light intensity of the RZ optical signal RZ-QPSK changes when the skew between the phase modulation optical signals LN1' and LN2 and CLK is changed from −0.5 UI to +0.5 UI changes. In the skew adjustment of LN1', even if the phase of LN2 is not optimum, when the light intensity of RZ-QPSK is maximum, the skew adjustment of LN1' can be performed. This fact shows that when the phase shifters (21-1, 21-2) apply control to the phases of LN1' and LN2 in a direction in which the average light intensity of the RZ optical signal RZ-QPSK increases, the skew adjustment of both LN1' and LN2 can be performed.

In the example of FIG. 6, the average light intensity is obtained as an optical current to which monitor light tapped by a 1:2 coupler 16 is optical-electrically converted by a light-receiving element 23. The adjustment unit 125 fluctuates the phase shift amounts of the phase shifters (21-1, 21-2), and if the average light intensity, that is, a photocurrent is reduced, the adjustment unit 125 fluctuates the phase shift amount on the opposite side, whereby the skew adjustment can be performed at an optimum timing.

In this example, although the skews of LN1' and LN2 are adjusted based on the phase of CLK, the skews of LN2 and CLK may be adjusted based on LN1', or the skews of LN1' and CLK may be adjusted based on LN2. The composition of the light intensity modulator 15 is disposed immediately behind the light source 10, a light pulse generated by the light intensity modulator 15 is branched, and phase modulation may be applied.

Second Embodiment

Figure 9:
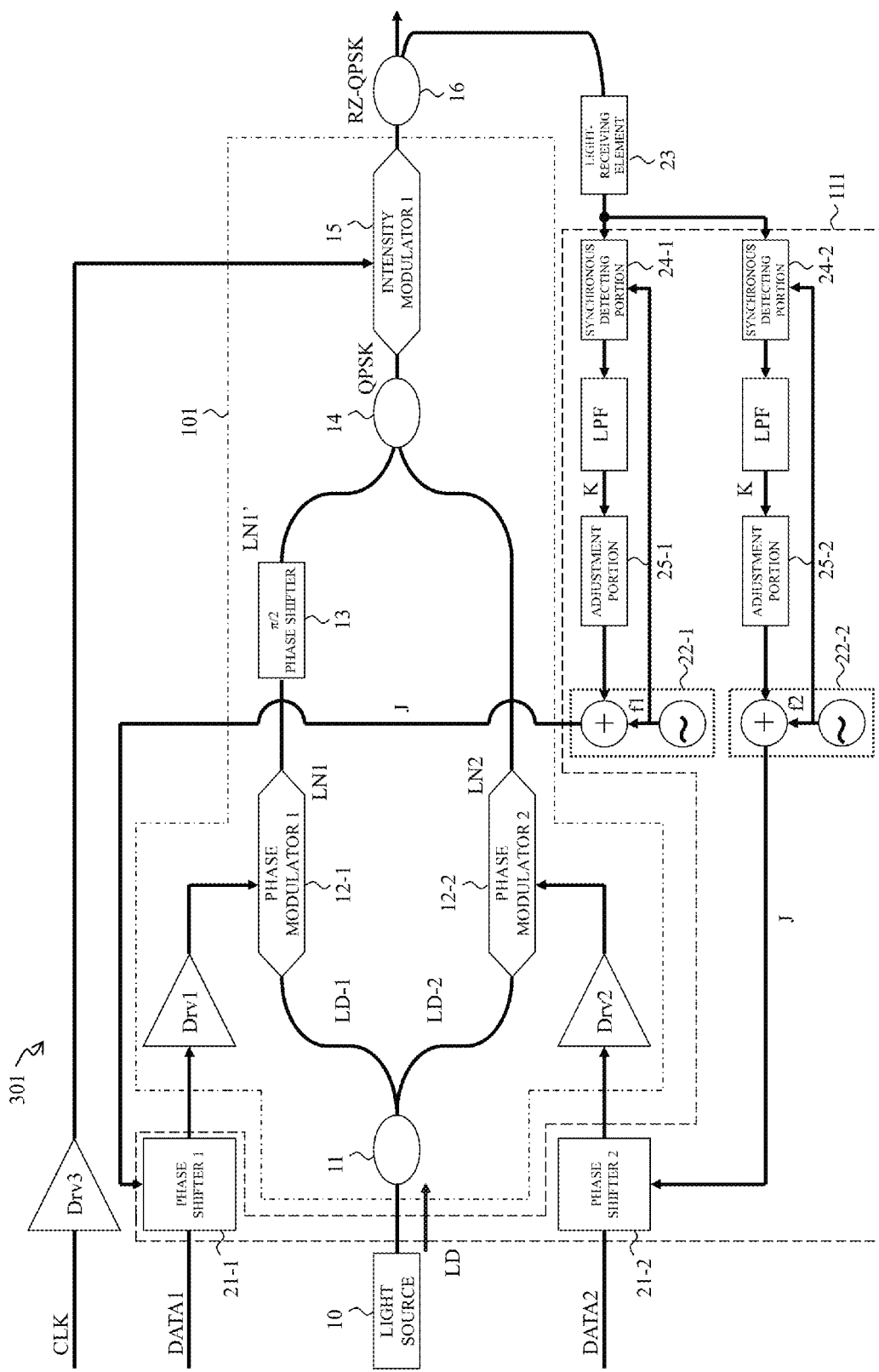
FIG. 9 is a view for explaining the phase modulation apparatus according to this disclosure.

FIG. 9 is a view for explaining a phase modulation apparatus 302 as an example of the present embodiment. The phase modulation apparatus 302 mounts an example of a configuration of the adjustment unit 125 described in the phase modulation apparatus 301 of FIG. 6.

A phase control circuit 111 has a pilot signal supplying portion 22 which performs pilot signal superimposition in which a pilot signal having a predetermined frequency is superimposed on a control signal J indicating the phase shift amount in which phase shifters (21-1, 21-2) shift the phase of a data signal and the phase shift amount is oscillated with a predetermined frequency, a synchronous detecting portion 24 which performs synchronous detection of an electrical signal, to which the output of the intensity modulator 15 is optical-electrically converted, with the same frequency as the pilot signal, and an adjustment portion 25 which performs adjustment operation in which the control signal J of the phase shift amount adjusted so that an error signal as the output of the synchronous detecting portion 24 is zero is output to the phase shifters (21-1, 21-2).

Especially, in the phase modulation apparatus 302, the two pilot signals provided for each of the phase shifters (21-1, 21-2) and having different frequencies are used, the pilot signal supplying portions (22-1, 22-2) superimpose the two pilot signals on the control signal J and perform the pilot signal superimposition, the synchronous detecting portions (24-1, 24-2) perform synchronous detection for each pilot signal, and the adjustment portions (25-1, 25-2) perform the adjustment operation for each pilot signal.

Figure 10:
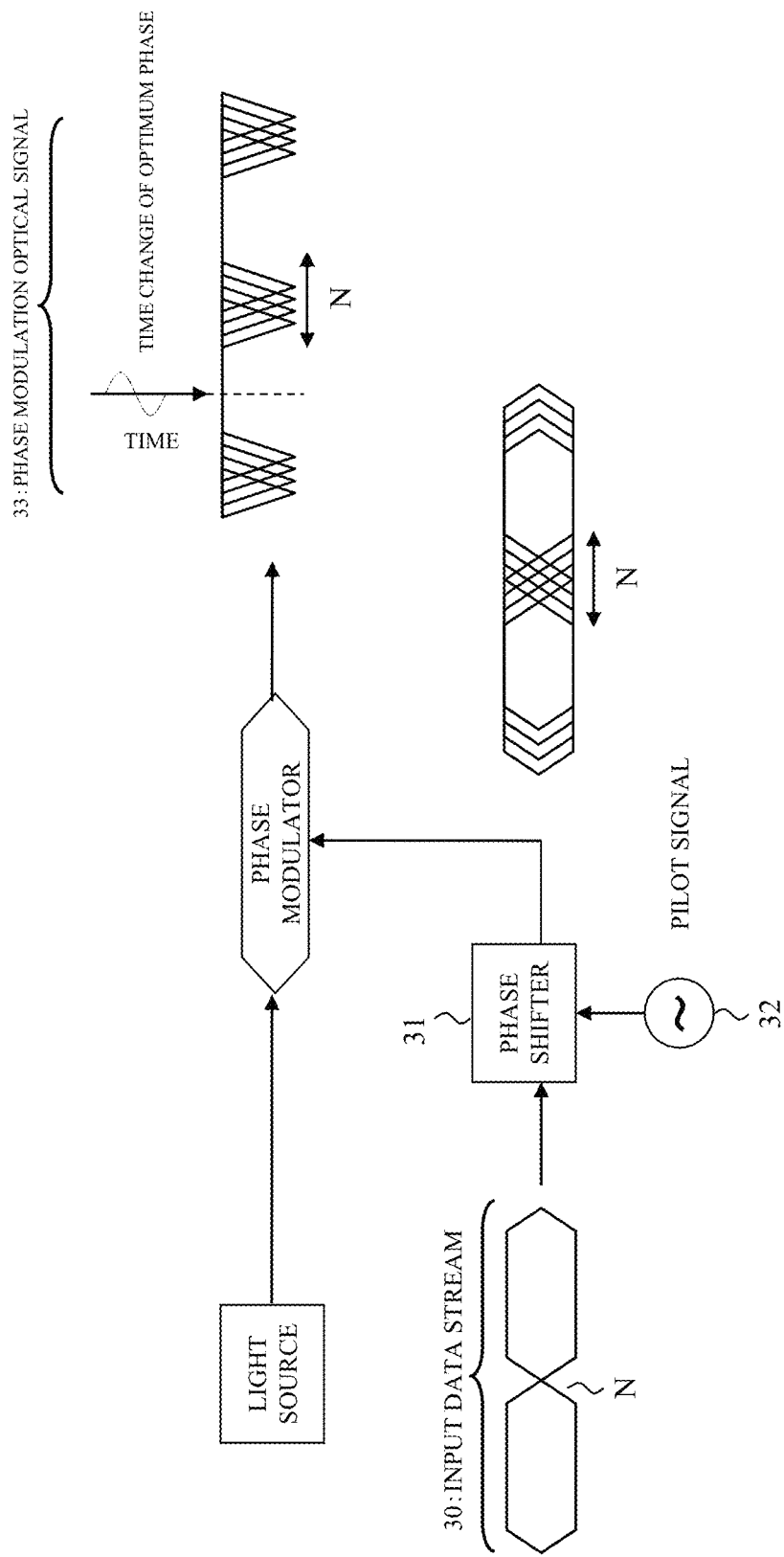
FIG. 10 is a view for explaining superimposition of a pilot signal on a phase modulation signal.

In this example, by virtue of the use of the pilot signal, the phase shifter control direction can be previously known. The summary of the method of determining the phase shifter control direction in the phase control circuit 111 will be described using FIGS. 10 and 11. FIG. 10 is a view schematically showing a change of a phase state of a phase modulation optical signal 33 according to a pilot signal 32. It is assumed that an input data stream 30 is input to a phase modulator via a phase shifter 31. It is assumed that the notch N is generated at the central portion of the input data stream 30. When the pilot signal 32 having a frequency f is introduced in the phase shifter 31, the notch N of the data signal output from the phase shifter 31 is oscillated at the frequency f, and therefore, the notch N of the phase modulation optical signal 33 modulated based on the data signal is also oscillated. The time oscillation of the notch is equivalent to the time oscillation of an optimum phase.

FIG. 11 is a view for explaining a relationship between a skew states of the phase modulation optical signal LN1' and the clock signal CLK and the average light intensity of the RZ optical signal RZ-QPSK. As described in FIG. 7, the average light intensity is maximum at an optimum timing (FIG. 11B) when the optimum phase of the phase modulation optical signal LN1' and the peak of the clock signal CLK coincide with each other, and the average intensity strength is reduced when skew occurs (FIGS. 11A and 11C). When a sinusoidal pilot signal having a frequency f1 is superimposed on the control signal J controlling the phase shifter 21-1, the optimum phase of the phase modulation optical signal LN1' is oscillated at the frequency f1. Although the oscillation provides a time fluctuation in the average light intensity, the state of the time fluctuation is changed by a phase progression/delay state relative to the clock signal CLK of the phase modulation optical signal LN1'.

More specifically, in FIG. 11A in which the phase of the phase modulation optical signal LN1' progresses, the average light intensity temporally fluctuates in time at the frequency f1 and the same phase as the pilot signal. In FIG. B in which the phase of the phase modulation optical signal LN1' is an optimum point, the light average intensity has a maximum value. Even if the phase of the phase modulation optical signal LN1' progresses or delays from the optimum point in this state, the average intensity strength attenuates. Thus, when the phase of the phase modulation light intensity LN1' is oscillated with the pilot signal, the time fluctuation of the light average intensity fluctuates twice the frequency f1. When the phase of the phase modulation light intensity LN1' delays, the average light intensity fluctuates in time at the frequency f1 and a phase opposite to the pilot signal.

Accordingly, the phase control circuit 111 can determine whether the phase modulation light signal LN1' is progressed or delayed, that is, decide the phase shift direction of the phase shifter 21-1 as long as it is possible to detect whether the time fluctuation of the optical average output has a phase that is the same as or different from the pilot signal. In the description here, this also applies to the phase modulation optical signal LN2.

The above operation will be more specifically described using FIG. 9. The pilot signal supplying portion 22-1 supplies the pilot signal having the frequency f1 to the phase shifter 21-1 to oscillate the phase of the phase modulation optical signal LN1'. The average light intensity of the RZ optical signal RZ-QPSK at this time is converted and detected as a photocurrent value by the light-receiving element 23, and, thus, to be synchronous-detected with the pilot signal by the synchronous detecting portion 24-1. When the time fluctuation of a photocurrent has the same phase as the pilot signal (the phase of the phase modulation optical signal LN1' progresses) or the opposite phase to the pilot signal (the phase of the phase modulation optical signal LN1' delays), synchronous detection outputs K respectively have a positive or negative value. When the phase modulation optical signal LN1' has the optimum phase, a signal having a double frequency wave of f1 does not appear in the synchronous detection output, and K is 0. As described above, the adjustment portion 25-1 adjusts the magnitude of the phase shift amount of the phase shifter 21-1 based on the positive and negative of K, whereby the skew adjustment is completed.

Hereinabove, although the skew adjustment of the phase modulation optical signal LN1 has been described, the skew adjustment of the phase modulation optical signal LN2 can be similarly performed by using the pilot signal having a frequency f2 from the pilot signal supplying portion 22-2, the synchronous detecting portion 24, and the adjustment portion 25-2.

Since the phase modulation apparatus 302 uses the pilot signals having the two frequencies (f1, f2), the skew adjustment of both the phase modulation optical signal LN1 and the phase modulation optical signal LN2 can be performed simultaneously.

In this example, although the skews of LN1' and LN2 are adjusted based on the phase of CLK, the skews of LN2 (LN1') and CLK can be adjusted based on LN1' (LN2), for example. The composition of the light intensity modulator 15 is disposed immediately behind the light source 10, a light pulse generated by the light intensity modulator 15 is branched, and phase modulation may be applied.

In the phase modulation apparatus 302, since the skew adjustment can be performed as needed, each component part is not required to have the same delay in the assembling, and skew fluctuation can be easily converged even if the temperature characteristics of parts and the change with time occur.

Third Embodiment

Figure 12:
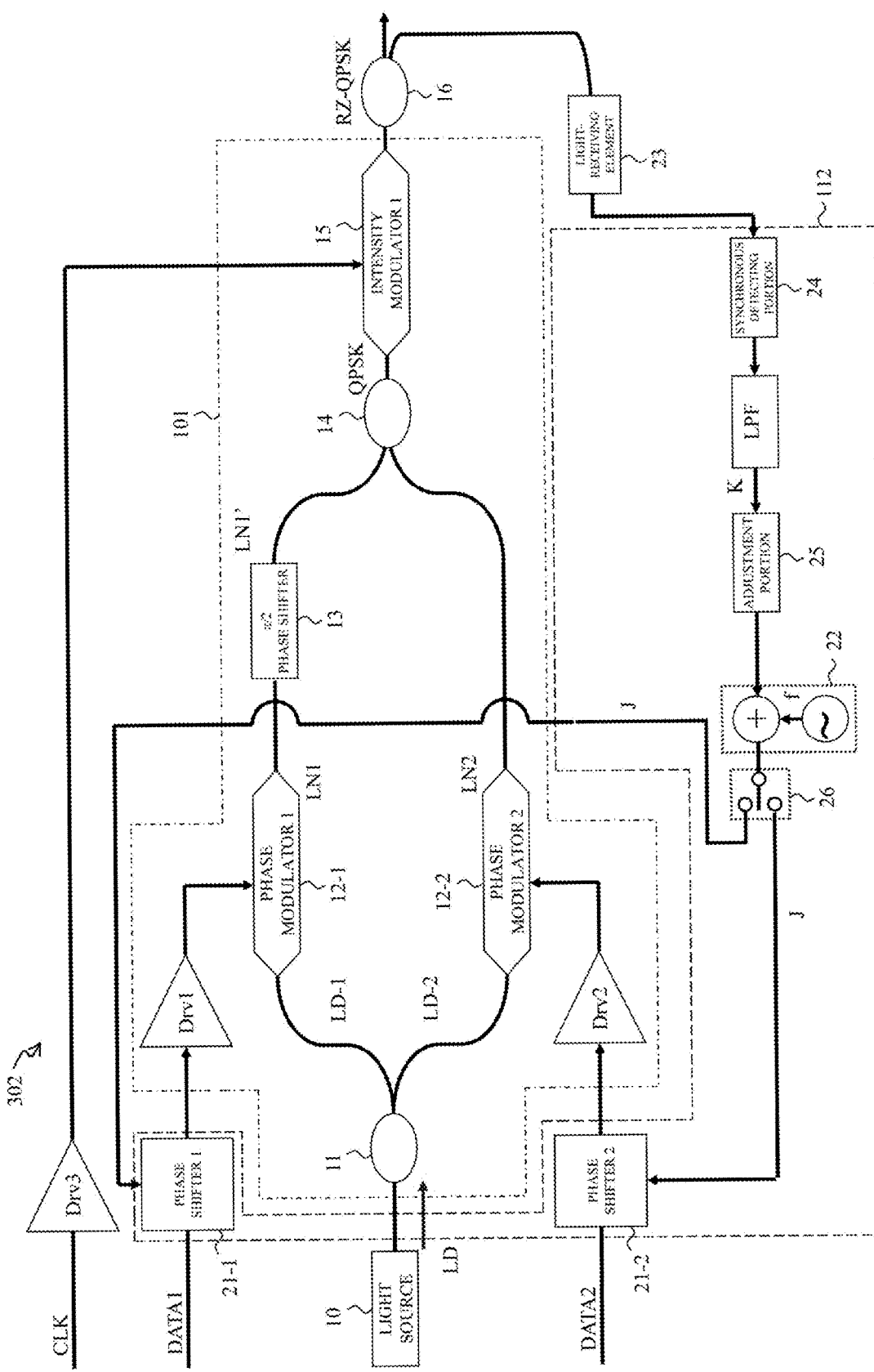
FIG. 12 is a view for explaining the phase modulation apparatus according to this disclosure.

FIG. 12 is a view for explaining a phase modulation apparatus 303 of the second embodiment. The phase modulation apparatus 303 is different from the phase modulation apparatus 302 of FIG. 9 in that a phase control circuit 112 is provided instead of the phase control circuit 111. The phase control circuit 112 and the phase control circuit 111 are different in the number of the pilot signals. The phase modulation apparatus 303 performs the skew adjustment with a single pilot signal having a frequency f. More specifically, the skew adjustment of the phase modulation optical signal LN1 and the skew adjustment of the phase modulation optical signal LN2 are performed while shifting the time. Thus, the phase modulation apparatus 303 has in the phase control circuit 112 a switching switch 26 switching the output destination of the pilot signal. The skew adjustment method is similar to the skew adjustment method in the phase modulation apparatus 302 described in FIGS. 10 and 11.

INDUSTRIAL APPLICABILITY

Although RZ-QPSK has been described as an example of the present disclosure, this disclosure can be applied to RZ-DQPSK, RZ-DP-QPSK (bit align), and RZ-DP-QPSK (symbol interleave).

EXPLANATION OF REFERENCE NUMERALS

10: Light source
11: 1:2 coupler
12-1, 12-2: Phase modulator
13: Phase shifter
14: 2:1 coupler
15: Intensity modulator
16: 1:2 coupler
21-1, 21-2: Phase shifter 22, 22-1, 22-2: Pilot signal supplying portion
23: Light-receiving element
24, 24-1, 24-2: Synchronous detecting portion
25, 25-1, 25-2: Adjustment portion
26: Switching switch
30: Input data stream
31: Phase shifter
32: Pilot signal
33: Phase modulation optical signal
101: RZ phase modulation circuit
111, 112: Phase control circuit
125: Adjustment unit
300 to 303: Phase modulation apparatus
LD, LD1, LD2: Continuous light
LN1, LN1', LN2: Phase modulation optical signal
QPSK: Multiplexed signal
RZ-QPSK: RZ optical signal
K: Detection signal
J: Control signal

What is claimed is:

1. A phase modulation apparatus comprising:
   a light source which outputs continuous light having a constant optical phase;
   a first phase modulator and a second phase modulator which modulate respective first and second optical phases of first and second continuous lights, obtained by branching an output of the light source, based on first and second electrical data signals, respectively;
   a $\pi/2$ phase shifter which shifts the optical phase of an output of one the first and second phase modulators by $\pi/2$;
   a multiplexer which combines an output of the $\pi/2$ phase shifter and an output of the other one of the first and second phase modulators to provide a combined light output;
   an intensity modulator which intensity-modulates the combined light output of the multiplexer with an electrical clock signal synchronized with at least one of the first and second electrical data signals;
   a first and a second phase shifter which are disposed in one of (a) first and second electrical paths, respectively, through which the first and second electrical data signals propagate to the first and second phase modulators, respectively, (b) said first electrical path and a third electrical path through which the electrical clock signal propagates to the intensity modulator, and (c) said second and third electrical paths, and which shift the Phase of at least one of the first and second electrical data signals or the phase of the electrical clock signal; and
   a phase control circuit which controls, based on the phase of the first and second electrical data signal or the phase of the electrical clock signal in the electrical path in which a phase shifter is not disposed, the phase of the first and or second electrical data signal or the phase of the electrical clock signal in the electrical path in which the phase shifter is disposed so that the intensity of the optical output from the intensity modulator is maximum.

2. The phase modulation apparatus according to claim 1, wherein the phase control circuit has:
   a pilot signal supplying portion which performs pilot signal superimposition in which a pilot signal having a predetermined frequency is superimposed on a control signal for indicating a phase shift amount in which the phase shifter shifts the phase of the electrical data signal or the phase of the electrical clock signal and oscillates the phase shift amount with the predetermined frequency;
   a synchronous detecting portion which performs synchronous detection of an electrical signal, to which an output of the intensity modulator is optical-electrically converted, with the same frequency as the pilot signal; and
   an adjustment portion which performs adjustment operation in which the control signal of the phase shift amount adjusted so that an error signal as the output of the synchronous detecting portion is zero is out put to the phase shifter.

3. The phase modulation apparatus according to claim 2, wherein
   in the phase control circuit, two pilot signals provided for each of the phase shifters and having different frequencies are used,
   the pilot supplying portion performs the pilot signal superimposition so that the two pilot signals are superimposed on the control signal,
   the synchronous detecting portion performs synchronous detection for each of the pilot signals, and
   the adjustment portion performs the adjustment operation for each of the pilot signals.

4. The phase modulation apparatus according to claim 2, wherein
   in the phase control circuit, a single pilot signal is used, and
   the pilot signal superimposition performed by the pilot signal supplying portion, the synchronous detection performed by the synchronous detecting portion, and the adjustment operation performed by the adjustment portion are performed in a time division manner.

* * * * *